Aug. 20, 1963  R. W. WILSON ETAL  3,100,974
CLUTCH

Filed April 28, 1961  2 Sheets-Sheet 1

RAYMOND W. WILSON
BRUNO BRILTS
INVENTORS

BY

P. F. Hilder

ATTORNEY

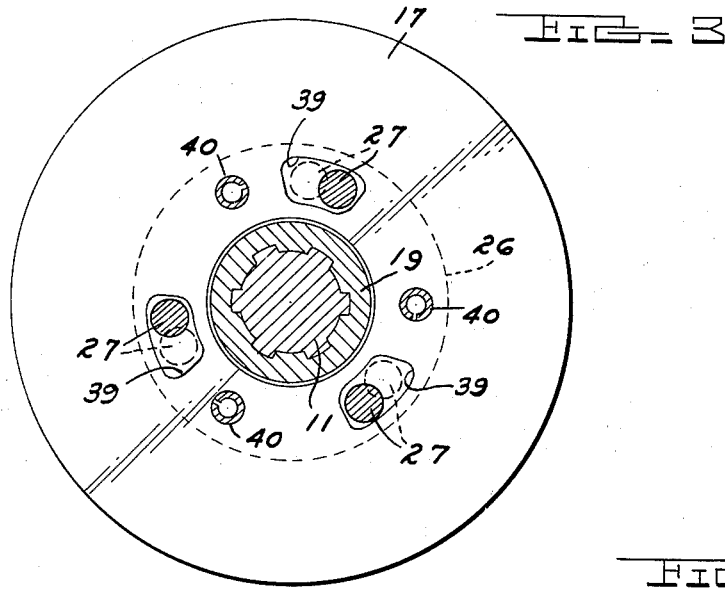
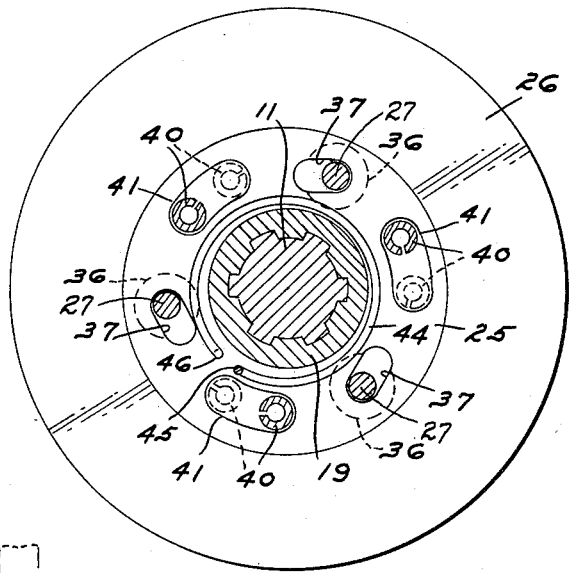
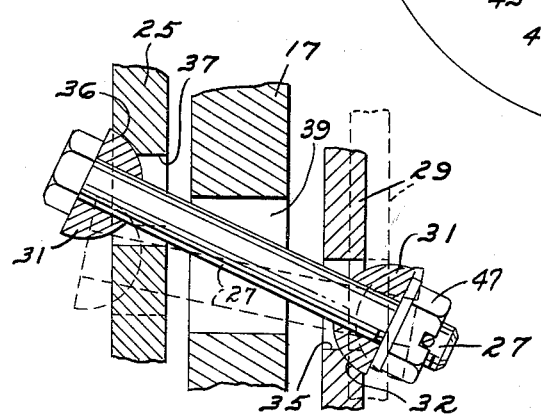
Aug. 20, 1963 R. W. WILSON ETAL 3,100,974
CLUTCH
Filed April 28, 1961 2 Sheets-Sheet 2
RAYMOND W. WILSON
BRUNO BRILTS
INVENTOR.
BY P. F. Hilder
ATTORNEY

United States Patent Office 3,100,974
Patented Aug. 20, 1963

3,100,974
CLUTCH
Raymond W. Wilson, Washington, and Bruno Brilts, Royal Oak, Mich., assignors to Ford Motor Company, Dearborn, Mich., a corporation of Delaware
Filed Apr. 28, 1961, Ser. No. 106,352
9 Claims. (Cl. 64—30)

This invention relates to clutches of the one-way, torque limiting type.

It often is desirable to incorporate in a drive line a torque limiting clutch which is designed to transmit torque up to a predetermined amount and then to slip when the amount is exceeded in order to protect an engine or driven machinery from damage due to excess torque. Torque limiting clutches, particularly those exposed to the weather or to adverse conditions, tend to rust and stick and often fail to slip when intended unless serviced regularly.

One-way clutches frequently also are incorporated in drive lines to permit a driven shaft to overrun a driving shaft rather than to have the driven shaft feeding power back to the driving shaft if driving is stopped or slowed. The clutch of the present invention serves both as an overrunning or one-way and a torque limiting clutch.

According to the present invention, the functions of both a one-way and a torque limiting clutch are designed into a single, compact unit comprising a driving plate, a driven plate and a pressure plate pressed together as a reaction to torque in one direction only, torque in the other direction unloading the plates and allowing the clutch to overrun. The torque limiting function of the clutch is achieved by choice of the friction lining between the plates and by limiting the force pressing the plates together. The overrunning of the clutch from time to time prevents adherence between the friction lining and the plates or corrosion of the friction surfaces so as to maintain the coefficient of friction between the parts and the torque at which the clutch will slip more or less constant.

Among the objects of the present invention are to provide a combined one-way and torque limiting clutch which is dependable in operation and simple and economical to manufacture, and generally to improve clutches of the type described. Other objects and objects relating to details of manufacture and use will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 3 is a vertical section taken along the line 3—3 of FIGURE 1, certain of the parts being shown in elevation.

FIGURE 4 is a vertical section taken along the line 4—4 of FIGURE 1, certain of the parts being shown in elevation.

FIGURE 5 is a diagrammatic fragmentary section taken along the line 5—5 of FIGURE 1 and showing operation of the tie bolts.

Figure 1:
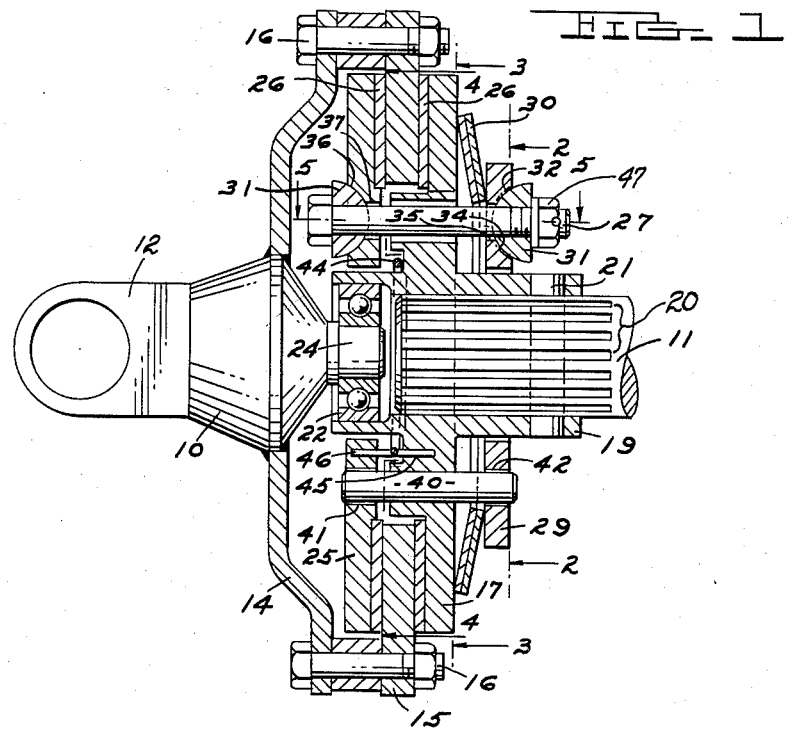
FIGURE 1 is an axial section taken through the clutch of the present invention, certain parts being shown in side elevation.

Referring now to the drawings, the clutch of the present invention includes a pair of coaxial shafts 10 and 11. Preferably, 10 is the input or driving shaft and 11 is the output or driven shaft, although, if desired, the shaft 11 may be the input shaft and shaft 10 the output shaft. If desired, a universal joint yoke 12 may be applied to an end of the shaft 10, forming a portion of a universal joint for driving the shaft. The shaft 10 is provided with a radially outwardly extending dished yoke or plate 14. A driving clutch plate 15 is secured to the yoke 14 by bolts 16 or otherwise, the driving plate being coaxial with the shaft 10.

The driven coaxial shaft 11 is provided with a clutch plate 17 extending in side-by-side relation to the clutch plate 15 and carried by a hub or sleeve 19 which is fixed to the shaft 11 by splines 20 and by a transverse, diametrically extending pin 21. The end of the sleeve 19 adjacent the shaft 10 is provided with a pilot bearing 22 receiving the reduced diameter end 24 of the shaft 10.

A pressure plate 25 is positioned about the sleeve 19, the pressure plate being free to move angularly about the axis of the shaft 11 and also to move axially of the shaft 11 to press the clutch plates 15 and 17 into firmer contact. The clutch plates 15 and 17 and the pressure plate 25 comprise a clutch assembly. Rings 26 of clutch facing material are provided between the clutch plates 15 and 17 and between the plate 15 and the pressure plate 25 to transmit driving torque between the plates. The rings 26 may either be free to rotate or fixed to the plates 15, 17 or 25 as desired, without substantially affecting operation of the clutch.

The clutch assembly of clutch plates 15, 17 and pressure plate 25 are compressed by a series of tie bolts 27 equally spaced about the shaft 11 and extending through the clutch assembly radially inwardly of the rings 26. Preferably, three tie bolts 27 are utilized spaced at 120° intervals about the shaft 11. One end of each tie bolt is received within a follower 29 extending about the sleeve 19, the follower being free to move along the sleeve in an axial direction. A resilient spring which preferably is in the form of a Belleville washer 30 is interposed between the follower 29 and the clutch assembly. The ends of the tie bolts 27 are provided with rockers 31 having a hemispherical surface 32 adapted for universal rocking movement within complementary shaped recesses 34 formed in the follower 29.

Figure 2:
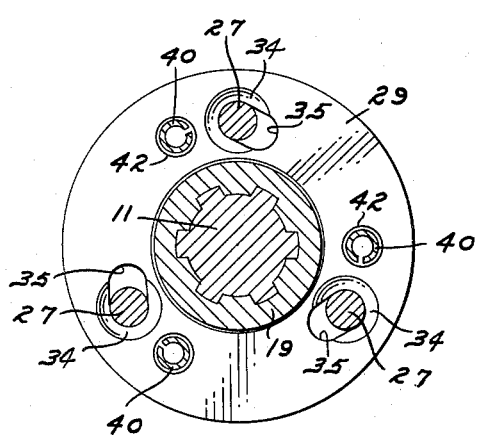
FIGURE 2 is a vertical section taken along the line 2—2 of FIGURE 1, certain of the parts being shown in elevation.

The follower 29 is provided with holes 35 for the tie bolts 27, which are elongated or oval shaped as indicated in FIGURE 2 to permit rocking of the tie bolts in a general circumferential direction as indicated in FIGURE 5. Similar spherical recesses 36 are provided in the surface of the pressure plate to receive the rockers 31 at the opposite ends of the tie bolts and the holes 37 in the pressure plate 25 for receiving the tie bolts are elongated similarly but in an opposite direction as indicated in FIGURE 4. Slots 39 in driven plate 17 (see FIGURE 3) are elongated sufficiently to permit clearance for rocking of the tie bolts 27.

At least one, and preferably three studs 40 at 120° intervals extend through the clutch assembly and the follower 29, the studs 40 extending perpendicular to the clutch plates 15 and 17 and being a drive fit within the clutch plate 17. The studs 40 are received within circumferentially extending slots 41 in the pressure plate 25 and holes 42 within the follower 29 to permit axial movement of the follower and the clutch plate on the studs.

A circular tickler spring 44 is provided surrounding the sleeve 19, the tickler spring consisting of a single turn of wire having oppositely directed ends 45 and 46 received within recesses in the clutch plate 17 and pressure plate 25 respectively. The arrangement of parts is such that when the tie bolts 27 extend nearly perpendicular to the clutch plates 15 and 17 (broken-line position of FIGURE 5) the studs 40 are at one end of the slots 41 (see FIGURE 4). The tickler spring, however, biases the pressure plate 25 angularly about its axis so as to rock or incline the tie bolts as indicated in FIGURE 5 and set up initial frictional engagement between the clutch plates 15 and 17 and the pressure plate 25 to cause the clutch assembly to engage more firmly as torque is applied, as will be explained. The tickler spring 44 is not sufficiently strong to rock the tie bolts 27 sufficiently to appreciably flatten or deform the Belleville washer 30.

In the assembly of the clutch of the present invention, castellated nuts 47 on the ends of the tie bolts 27 are adjusted hand tight with the tie bolts extending generally perpendicular to the plane of the clutch plates (broken-line position of FIGURE 5). Accordingly, the tickler spring 44 will angularly displace the pressure plate only a short portion of its total angular travel, which is limited by the slots 41 in the pressure plate.

Driving torque from the shaft 10 in one direction rotates the clutch plate 15 and, due to the initial frictional engagement caused by the tickler spring 44, tends also to rotate pressure plate 25 relative to the driven clutch plate 17 and the follower 29. This angular movement of the pressure plate 25 rocks the tie bolts 27 additionally (full-line position of FIGURE 5) so as to additionally compress the clutch assembly, which in turn establishes greater frictional engagement between the driving plate and the pressure plate to rock the tie bolts further. As the tie bolts 27 rock towards the extreme position shown in FIGURE 5, the Belleville washer 30 is flattened somewhat. However, Belleville washers have the inherent characteristic of undergoing considerable deformation at a substantially constant loading, thereby effectively limiting the maximum pressure with which the clutch assembly is compressed.

Under increased torque, the frictional engagement between the driving plate 15 and the pressure plate 25 will angularly displace the pressure plate until the studs 40, which are carried by the driven plate 17, are moved a total distance equal to the length of the slots 41, an angular distance which may be about 17°. After this movement has occurred, the pressure plate 25 is against the studs 40 and may be displaced no further relative to the driven plate 17, and turns with the driven plate, transmitting about one-half of the torque load from the driving plate through the studs to the driven plate and thus to the driven shaft 11. Thus, the limit of torque which the clutch assembly will transmit is determined by the radius and coefficient of friction of the frictional surfaces of the clutch assembly and by the force required to flatten the Belleville washer 30. Due to the characteristics of Belleville washers and to the fact that maximum torque is transmitted only after the pressure plate 25 has been moved its full distance of travel so as to transmit driving torque through the studs 40, the adjustment of the castellated nuts 47 on the tie bolts 27 is not critical in determining the torque limit of the present clutch. In fact, the torque limit will not vary substantially even after a considerable amount of wear on the frictional facing rings 26 and on the clutch plates. When torque in the driven shaft 11 exceeds the torque in the driving shaft 10, the frictional engagement between the pressure plate 25 and the driving clutch plate 15 will cause the pressure plate to be displaced angularly in the reverse direction from that when the driving torque exceeds the driven torque. This displacement of the pressure plate 25 will deform the tickler spring 44 somewhat until the tie bolts have been rocked to the broken-line position indicated in FIGURE 5, at which time the studs 40 are against the opposite ends of the slots 41 in the pressure plate (position shown in FIGURE 4) and there is very light pressure against the clutch assembly, thus permitting relative movement between the plates 17 and 25 carried by shaft 11 and the clutch plate 15 carried by shaft 10, there being only slight friction between the parts.

Both the overrunning action of the clutch of the present invention and the slippage of the plates due to the torque limiting action prevent corrosion and sticking of the clutch assembly so as to maintain relatively constant friction characteristics of the clutch and to provide a more dependable single assembly which does not require regular maintenance in order to assure that both the torque limiting and overrunning functions of the clutch will be operative when required.

We claim:

1. An overrunning, torque limiting clutch comprising: a driving shaft, a driving clutch plate fixed thereto, a coaxial driven shaft, a driven clutch plate fixed thereto, a pressure plate, the driving plate being interposed between the pressure plate and the driven plate and the pressure plate being capable of limited rotation about the driven shaft and adapted to press the clutch plates into frictional engagement, means responsive to torque from the driving shaft in one direction for angularly displacing the pressure plate due to frictional drag between the pressure plate and driving plate, means responsive to displacement of the pressure plate for pressing the driving plate, driven plate and pressure plate together, and means for limiting the pressure between the pressure plate, driving plate and driven plate caused by said displacement of the pressure plate.

2. An overrunning, torque limiting clutch comprising: a driving shaft, a driving clutch plate fixed thereto, a coaxial driven shaft, a driven clutch plate fixed thereto, a pressure plate, the driving plate being interposed between the pressure plate and the driven plate and the pressure plate being capable of limited rotation in a fixed amount about the driven shaft and adapted to press the clutch plates into frictional engagement, means responsive to torque from the driving shaft in one direction for angularly displacing the pressure plate due to frictional drag between the pressure plate and driving plate, means responsive to displacement of the pressure plate for pressing the driving plate, driven plate and pressure plate together, and means for limiting the pressure between the pressure plate, driving plate and driven plate caused by said displacement of the pressure plate.

3. An overrunning, torque limiting clutch, comprising a pair of coaxial shafts, a clutch assembly including a clutch plate fixed to each of the shafts and a pressure plate, the clutch plates being positioned in coaxial, side-by-side relation and the pressure plate being capable of limited rotation about one of the shafts and adapted to press the clutch plates into frictional engagement, a series of tie bolts extending through the clutch assembly at equally spaced intervals, a follower extending about one of the shafts and receiving one end of the tie bolts, driving torque from the input shaft and clutch plate carried thereby angularly displacing the pressure plate about its axis to rock the tie bolts and compress the clutch assembly together more firmly, and a Belleville washer interposed between the follower and the clutch assembly to limit the compressive force applied to the clutch assembly by the tie bolts.

4. An overrunning, torque limiting clutch, comprising a pair of coaxial shafts, a clutch assembly including a clutch plate fixed to each of the shafts and a pressure plate, the clutch plates being positioned in coaxial, side-by-side relation and the pressure plate being capable of limited rotation about one of the shafts and adapted to press the clutch plates into frictional engagement, a series of tie bolts extending through the clutch assembly at equally spaced intervals, driving torque from the input shaft and clutch plate carried thereby angularly displacing the pressure plate about its axis to rock the tie bolts and compress the clutch assembly together more firmly, and a Belleville washer concentric with the shafts and interposed between one end of each of the tie bolts and the clutch assembly to limit the compressive force applied to the clutch assembly by the tie bolts.

5. An overrunning, torque limiting clutch, comprising a pair of coaxial shafts, a clutch assembly including a clutch plate fixed to each of the shafts and a pressure plate, the clutch plates being positioned in coaxial, side-by-side relation and the pressure plate being capable of limited rotation about one of the shafts and adapted to press the clutch plates into frictional engagement, a series of tie bolts extending through the clutch assembly at equally spaced intervals, driving torque from the input shaft and clutch plate carried thereby angularly displacing the pressure plate about its axis to rock the tie bolts and compress the clutch assembly together more firmly, and resilient means interposed between one end of each of the tie bolts and the clutch assembly to limit the compressive force applied to the clutch assembly by the tie bolts.

6. An overrunning, torque limiting clutch comprising: a driving shaft, a driving clutch plate fixed thereto, a coaxial driven shaft, a driven clutch plate fixed thereto, a pressure plate, the driving plate being interposed between the pressure plate and the driven plate and the pressure plate being capable of limited rotation about the driven shaft and adapted to press the clutch plates into frictional engagement, a series of tie bolts extending through the driving plate, driven plate and pressure plate at equally spaced intervals, driving torque from the driving plate angularly displacing the pressure plate about its axis to rock the tie bolts and compress the clutch assembly together more firmly, a tickler spring extending about the driven shaft between the driven plate and pressure plate to bias the pressure plate towards displaced position and thus establish limited friction between the driving plate and pressure plate, and resilient means interposed between one end of each of the tie bolts and the assembly of driving plate, driven plate and pressure plate to limit the compressive force applied to the assembly by the tie bolts.

7. An overrunning, torque limiting clutch comprising: a driving shaft, a driving clutch plate fixed thereto, a coaxial driven shaft, a driven clutch plate fixed thereto, a pressure plate, the driving plate being interposed between the pressure plate and the driven plate and the pressure plate being capable of limited rotation about the driven shaft and adapted to press the clutch plates into frictional engagement, a series of tie bolts extending through the driving plate, driven plate and pressure plate at equally spaced intervals, driving torque from the driving plate angularly displacing the pressure plate about its axis to rock the tie bolts and compress the clutch assembly together more firmly, a tickler spring extending about the driven shaft between the driven plate and pressure plate to bias the pressure plate towards displaced position and thus establish limited friction between the driving plate and pressure plate, and a Belleville washer interposed between one end of each of the tie bolts and the assembly of driving plate, driven plate and pressure plate to limit the compressive force applied to the assembly by the tie bolts.

8. An overrunning, torque limiting clutch comprising: a driving shaft, a driving clutch plate fixed thereto, a coaxial driven shaft, a driven clutch plate fixed thereto, a pressure plate, the driving plate being interposed between the pressure plate and the driven plate and the pressure plate being capable of limited rotation about the driven shaft and adapted to press the clutch plates into frictional engagement, a series of tie bolts extending through the driving plate, driven plate and pressure plate at equally spaced intervals, driving torque from the driving plate angularly displacing the pressure plate about its axis to rock the tie bolts and compress the clutch assembly together more firmly, and a Belleville washer interposed between one end of each of the tie bolts and the assembly of driving plate, driven plate and pressure plate to limit the compressive force applied to the assembly by the tie bolts.

9. An overrunning, torque limiting clutch comprising: a driving shaft, a driving clutch plate fixed thereto, a coaxial driven shaft, a driven clutch plate fixed thereto, a pressure plate, the driving plate being interposed between the pressure plate and the driven plate and the pressure plate being capable of limited rotation about the driven shaft and adapted to press the clutch plates into frictional engagement, a series of tie bolts extending through the driving plate, driven plate and pressure plate at equally spaced intervals, driving torque from the driving plate angularly displacing the pressure plate about its axis to rock the tie bolts and compress the clutch assembly together more firmly, and resilient means interposed between one end of each of the tie bolts and the assembly of driving plate, driven plate and pressure plate to limit the compressive force applied to the assembly by the tie bolts.

References Cited in the file of this patent

UNITED STATES PATENTS

| 249,325 | Edwards | Nov. 8, 1881 |

FOREIGN PATENTS

| 227,653 | Switzerland | Sept. 16, 1943 |
| 660,180 | Germany | May 19, 1938 |